US008801348B2

(12) United States Patent
Jordan et al.

(10) Patent No.: US 8,801,348 B2
(45) Date of Patent: Aug. 12, 2014

(54) CONNECTOR

(71) Applicant: Kee Safety Ltd., West Midlands (GB)

(72) Inventors: Matthew Jordan, Yorkshire (GB); Paul Bowes, Berkshire (GB)

(73) Assignee: Kee Safety Limited, West Midlands (GB)

( * ) Notice: Subject to any disclaimer, the term of this patent is extended or adjusted under 35 U.S.C. 154(b) by 0 days.

(21) Appl. No.: 13/846,023

(22) Filed: Mar. 18, 2013

(65) Prior Publication Data

US 2013/0243543 A1      Sep. 19, 2013

(30) Foreign Application Priority Data

Mar. 19, 2012    (GB) .................................. 1204799.9

(51) Int. Cl.
*F16B 13/06*       (2006.01)
(52) U.S. Cl.
USPC .......................... 411/55; 411/57.1; 411/80.5
(58) Field of Classification Search
USPC ......... 411/55, 57.1, 60.1, 60.2, 63, 80.2, 80.5
See application file for complete search history.

(56) References Cited

U.S. PATENT DOCUMENTS

| | | | | | |
|---|---|---|---|---|---|
| 3,941,028 | A | * | 3/1976 | Lobello et al. .................. | 411/55 |
| 4,474,515 | A | * | 10/1984 | Pitzer ............................. | 411/16 |
| 5,685,678 | A | * | 11/1997 | Giannuzzi et al. .............. | 411/55 |
| 5,690,455 | A | * | 11/1997 | Fischer et al. .................. | 411/55 |
| 6,293,743 | B1 | * | 9/2001 | Ernst et al. ...................... | 411/24 |
| 6,457,922 | B1 | * | 10/2002 | Tsai ................................ | 411/55 |
| 6,524,046 | B2 | * | 2/2003 | Hsu ................................ | 411/61 |
| 8,192,122 | B2 | * | 6/2012 | Gaudron et al. ............. | 411/60.1 |
| 8,444,355 | B2 | * | 5/2013 | Gaudron et al. ............. | 411/60.1 |
| 2002/0054805 | A1 | * | 5/2002 | Kaibach et al. ............. | 411/60.1 |
| 2002/0106256 | A1 | * | 8/2002 | Kaibach et al. ............. | 411/60.1 |
| 2004/0253075 | A1 | * | 12/2004 | Liebig et al. ................. | 411/57.1 |

FOREIGN PATENT DOCUMENTS

| | | |
|---|---|---|
| GB | 2311579 | 10/1997 |
| GB | 2385398 A | 8/2003 |
| GB | 2421554 | 6/2006 |
| WO | 2007099739 | 9/2007 |

OTHER PUBLICATIONS

GB Search Report, dated Jul. 17, 2013, from corresponding GB application.
GB Search Report, Dated Jul. 24, 2012, in GB 1204799.9.

* cited by examiner

*Primary Examiner* — Roberta Delisle
(74) *Attorney, Agent, or Firm* — Young & Thompson

(57) ABSTRACT

A blind fastener for clamping together two components through which the fastener extends comprises a sleeve having a radially expandable first end, a threaded fastener for extending through the sleeve, an expansion head threadedly mounted on the threaded fastener whereby movement of the expansion head towards the second end of the sleeve expands the first end, a collar for engaging with the second end of the sleeve and having an aperture through which the threaded fastener extends, the threaded fastener having a head formation for rotation of the threaded when the collar is positioned between the head portion and the sleeve, and said second end of the sleeve and the confronting surface of the collar comprising inter-engaging formations which resist relative rotation of the sleeve and collar but permit their axial separation.

19 Claims, 4 Drawing Sheets

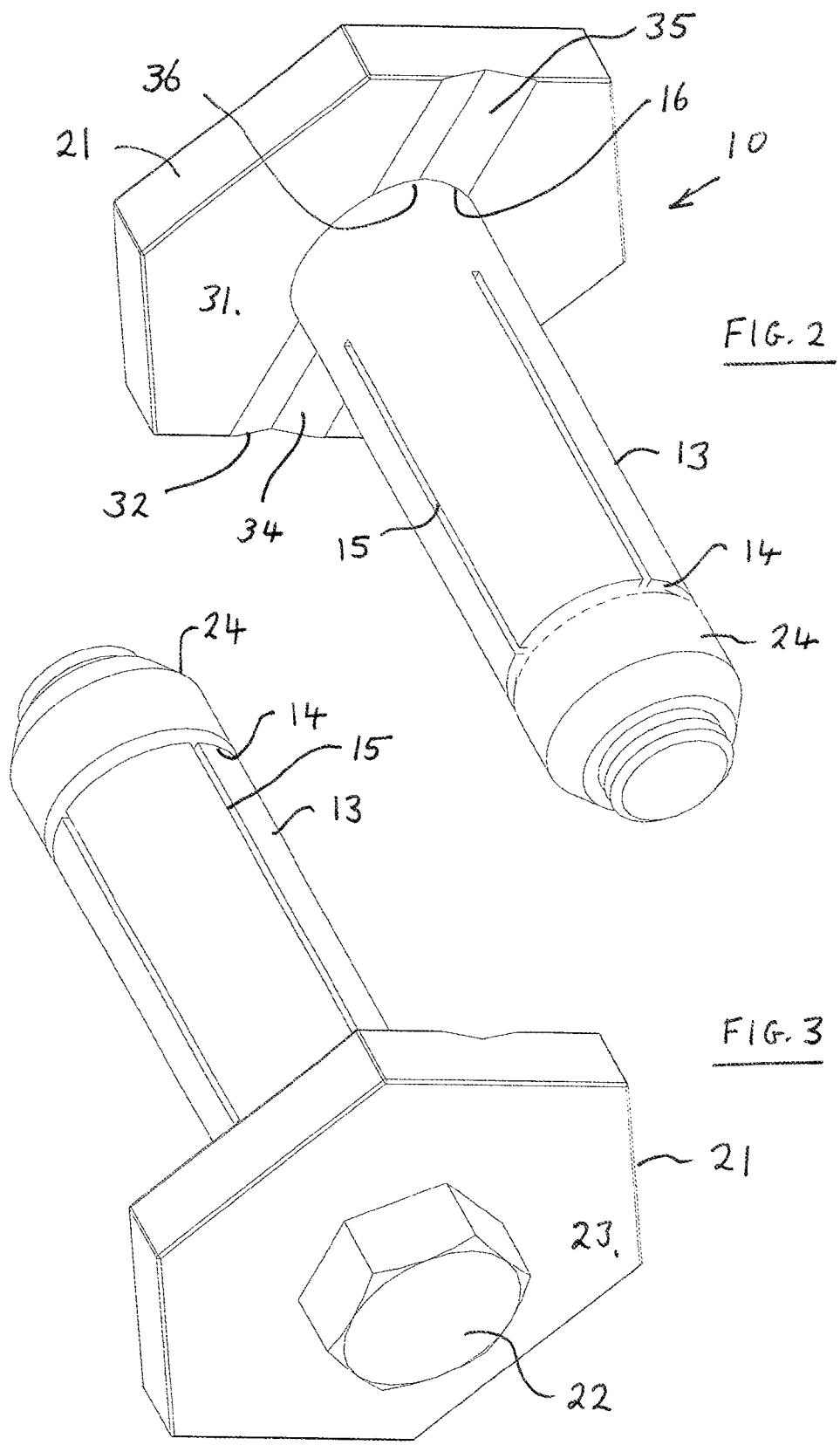

CONNECTOR

BACKGROUND OF THE INVENTION

1. Field of the Invention

This invention relates to a connector for securing together two components.

It relates in particular but not exclusively to a connector of the so-called blind fastener type and which may be employed to clamp together two components in an arrangement in which the surface of one of the components to be acted upon by the clamping force is not accessible for provision of a tool to assist in creating the clamping force.

2. Description of the Related Art

Blind fastener type anchoring devices frequently are employed in situations in which it is desired to attach a component to a member only one side of which is accessible. Examples of such members are a wall surface the reverse side of which is not readily accessible, or a hollow metal section the interior of which is not readily accessible.

It is known to provide a blind fastener type anchoring device which comprises a threaded bolt having a bolt head at one end. A conical expansion head is threadedly mounted at the other end of the bolt. Also surrounding the bolt and abutting against the bolt head is an apertured sleeve head plate. Finally, extending between the sleeve head plate and the conical expansion head is a longitudinally slit, circumferentially expandable, tubular sleeve.

The sleeve head may be integral with the tubular sleeve of the anchoring device or may be independent but arranged to provide a reaction face against which the sleeve may bear, either directly or via an interposed member, when the anchoring device is tightened. The sleeve head is selected to have a cross-sectional size which exceeds that of the sleeve such that an abutment face region of the sleeve head lying outwards of the sleeve may bear against a support member relative to which the anchoring device is being secured.

Prior to insertion in an aperture the expansion head is threaded along the bolt until it abuts against the sleeve. The engagement between the sleeve and the expansion head then restrains the expansion head from turning when the bolt is rotated within the sleeve.

In order to fasten a component to a support member an aperture in the component is first aligned with a corresponding aperture in the support member. The bolt and the sleeve of the fastening device are then inserted through the aligned apertures until the sleeve head plate abuts against the component. The bolt is then tightened. Because the engagement between the conical expansion head and the sleeve prevents the conical head from rotating with the bolt, the tightening of the bolt causes the conical head to be drawn along the bolt towards the bolt head. This forces the longitudinally slit sleeve to expand radially outwards. Eventually the sleeve expands into contact with that material of the support member which defines the aperture in the support member. In consequence the component and the support member become gripped between the sleeve plate and the expanded distal end of the sleeve.

For the purpose of constructing the assembly, a gripping tool is attached to the sleeve head to prevent rotation of the sleeve head plate, and a tightening tool is attached to the bolt head and rotated relative to the sleeve, thereby to tighten the fastening device. A tool as described in our UK patent GB 2410713B may be employed.

Although blind fastener devices of the aforedescribed type generally may function satisfactorily, particularly for low loading applications, they suffer certain disadvantages. In the case of a sleeve and sleeve head being formed integrally with one another it is found that the fastener commonly is not able to achieve the degree of clamping force necessary. In particular it is not possible reliably to achieve the clamping force necessary to comply with the requirements of certain safety standards such as, for example, that of an ICC standard. A further disadvantage is that in order to provide for the axial compression which is taught as being necessary by GB 2421554 and GB 2311579 the sleeve needs to be machined to form a circumferentially extending groove, thus adding to the manufacturing cost.

In the case of a fastener of the type having a sleeve which is not integral with a sleeve head plate it is known to provide therebetween an axially compressible washer which is intended, in use, to resist relative rotation of the sleeve and sleeve head plate and to provide the fastener with the required axial compressibility feature. However it is found that the washer cannot be relied on to resist said relative rotation. Therefore there is the risk that the fastener is mistakenly assumed to have been properly fitted and tightened. A further disadvantage of this type of fastener is that it requires provision of five components, which adds to the manufacturing and assembly costs as compared with a fastener comprising fewer components.

BRIEF SUMMARY OF THE INVENTION

The present invention seeks to provide a blind fastener in which at least some of the aforedescribed disadvantages of hitherto known blind fastener devices are mitigated or overcome.

In accordance with one aspect of the present invention there is provided a blind fastener for clamping together two components through which, in use, the fastener extends, said fastener comprising:

a sleeve having a first end which is radially expandable;

a threaded fastener for extending through the sleeve;

an expansion head threadedly mounted on the threaded fastener to engage with said first end of the sleeve whereby movement of the expansion head towards a second end of the sleeve forces the first end to expand;

a collar for engaging with the second end of the sleeve and having an aperture through which the threaded fastener extends;

the threaded fastener having a head formation for effecting rotation of the threaded fastener in an assembled condition in which the collar is positioned between the head portion and the sleeve, and said second end of the sleeve and the collar defining confronting surfaces and said surfaces comprising inter-engaging formations which resist relative rotation of the sleeve and collar but permit their axial separation.

Preferably the sleeve is substantially incompressible in the direction of the length of the sleeve. Preferably the sleeve is formed from a material, such as metal, which has a high resistance to compression. Preferably the sleeve material has a Young's modulus of elasticity of at least 50 GPa, more preferably at least 125 GPa.

The inter-engaging formations in the confronting surfaces of the sleeve and collar preferably comprise a depression in the surface of the collar and which is engaged by a protrusion defined by the shape of the second end of the sleeve.

Preferably the depression extends in a length direction which is parallel with collar surface and which preferably intersects with the longitudinal axis of the sleeve.

It is further preferred that the depression extends across the whole of the width of the collar surface such that it comprises two portions separated by the collar aperture.

Preferably the depression comprises a surface which at least in part is a sloping surface which is inclined to the collar surface and the longitudinal axis of the sleeve. For a depression which has a length direction, preferably the depression is substantially of a V shape in cross-section, or other trough shape which defines at least one sloping side face. Alternatively, however, other cross-sections such as square or semi-circular may be employed.

Said second end of the sleeve may comprise a pair of V shape ridges each dimensioned such that in use they each engage with a respective one of two portions of the depression in the collar. However the sleeve end may comprise protrusions of other shapes and/or of a greater number for inter-engaging with a depression in the confronting collar surface.

Preferably the collar is substantially rigid and incompressible in the length direction of the sleeve. Preferably the area of the collar surface which is free from a depression is at least fifty percent and more preferably at least seventy percent of the area defined by the periphery of the collar surface. Thus the rigidity of the collar is not prejudiced significantly by the provision of a depression. Furthermore this avoids any significant tendency for outer regions of that collar surface gradually to embed in a surface of one of the components and thus reduce the strength of the clamping force.

Although the collar may have a radially outer peripheral surface which is a smooth, cylindrical surface, preferably the collar has a textured and/or non-circular outer peripheral surface to assist restraint of rotation of the collar as a threaded fastener is rotated. Thus it may be textured to facilitate gripping of the collar by means such as a mole wrench or it may be of a non-circular cross-sectional shape such as a hexagonal shape for engagement by a spanner.

Said first end of the sleeve may comprise slots which extend longitudinally relative to the length of the sleeve. The slots may extend at an angle to the longitudinal axis of the sleeve, for example helically in the case of a sleeve of the usual circular cross-sectional shape, but more preferably they extend substantially parallel with the longitudinal axis of the sleeve.

One slot may extend continuously along the whole length of the sleeve but preferably the sleeve is circumferentially continuous in the region of said second end.

The slots may be of substantially zero width, in the form of slits. Preferably, however, they have a width which, at least close to the first end of the sleeve, is sufficient to enable the slot edges to be engaged by the expansion head in a manner in which the head is inhibited from rotating relative to the sleeve.

The present invention provides also an assembly comprising two components secured together by a blind fastener of the subject invention. The confronting surfaces of the collar and one of said two components may be surfaces which are substantially free to rotate relative to one another, in sliding contact, prior to the surfaces being held firmly against one another.

BRIEF DESCRIPTION OF THE DRAWINGS

An embodiment of the present invention will now be described, by way of example, with reference to the accompanying drawings in which:

FIG. 2 is a perspective view of the connector of FIG. 1;

FIG. 3 is a perspective view in a direction opposite that of FIG. 2;

DETAILED DESCRIPTION OF THE PREFERRED EMBODIMENTS

Figure 1:
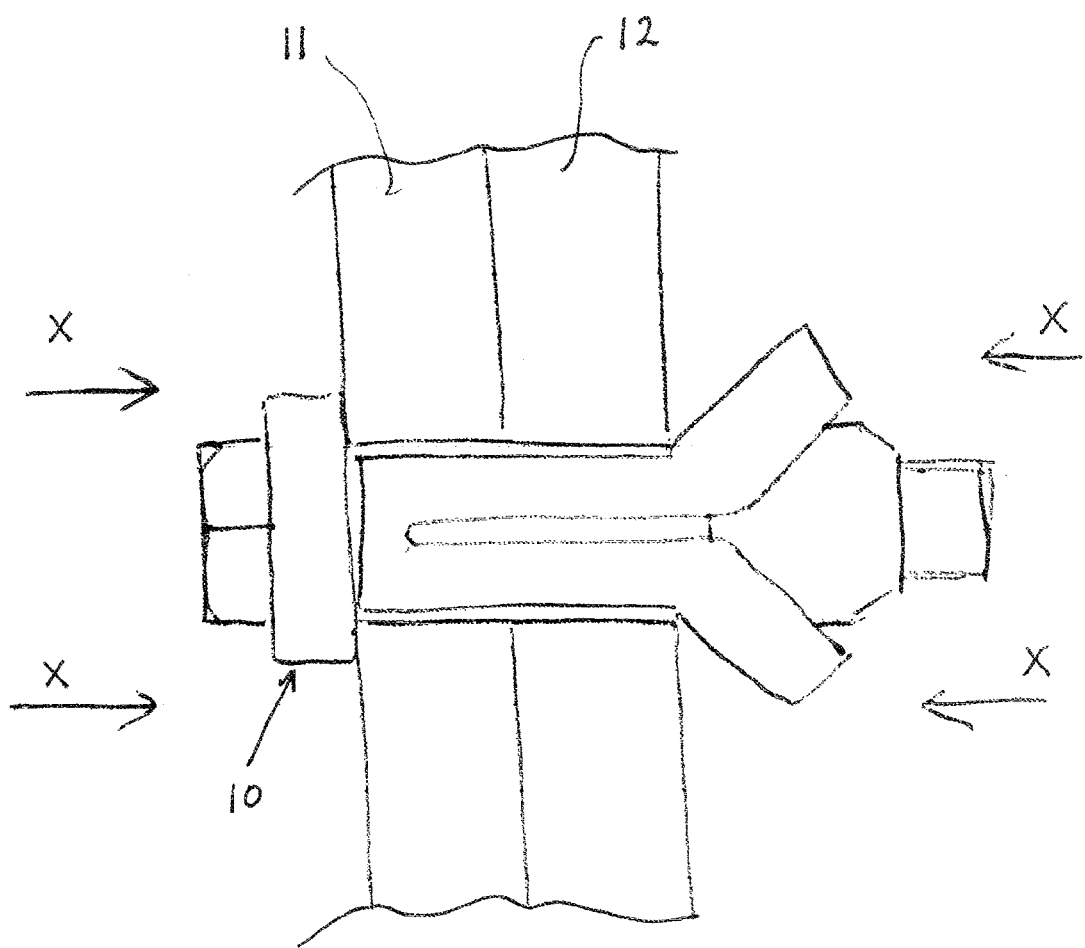
FIG. 1 is a sectional view of an assembly of two components secured together by a connector of the present invention.
Figure 4:
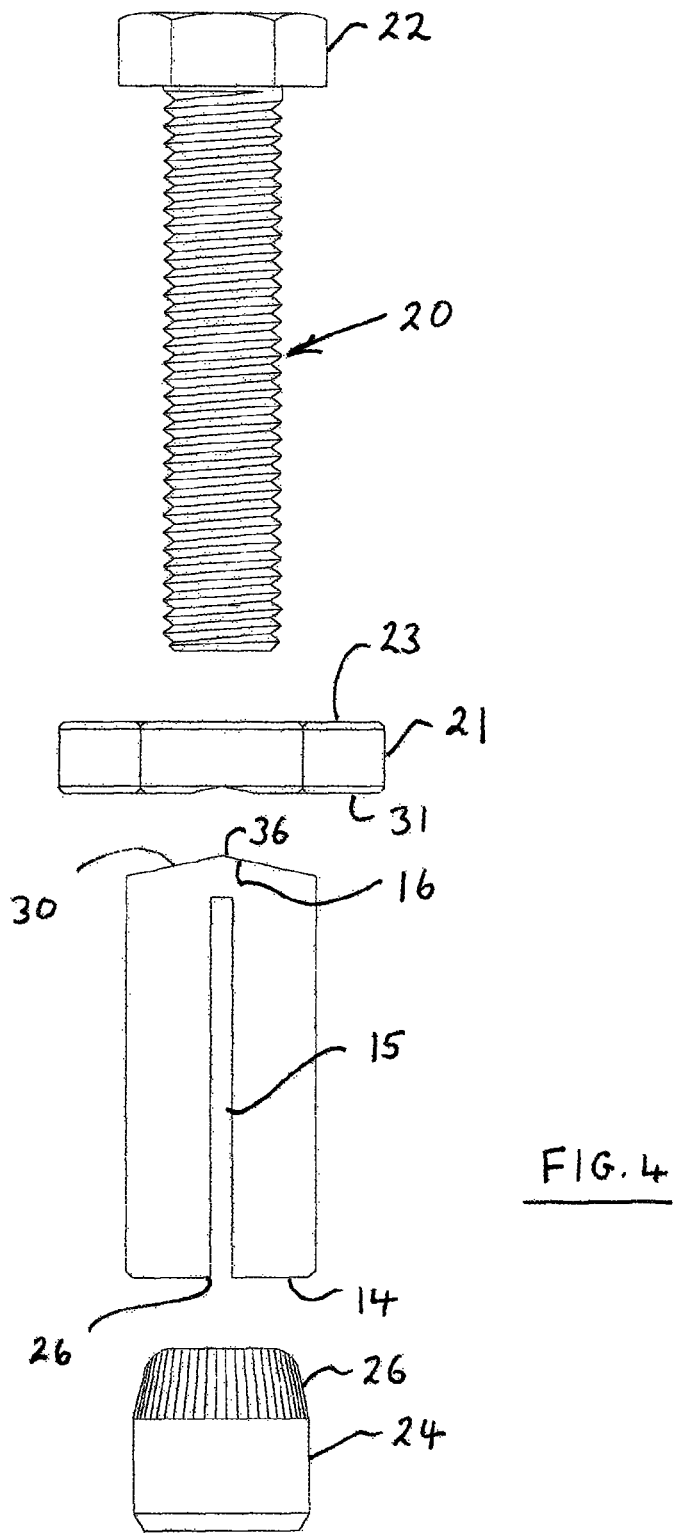
FIG. 4 is an exploded side view of the connector.
Figure 5:
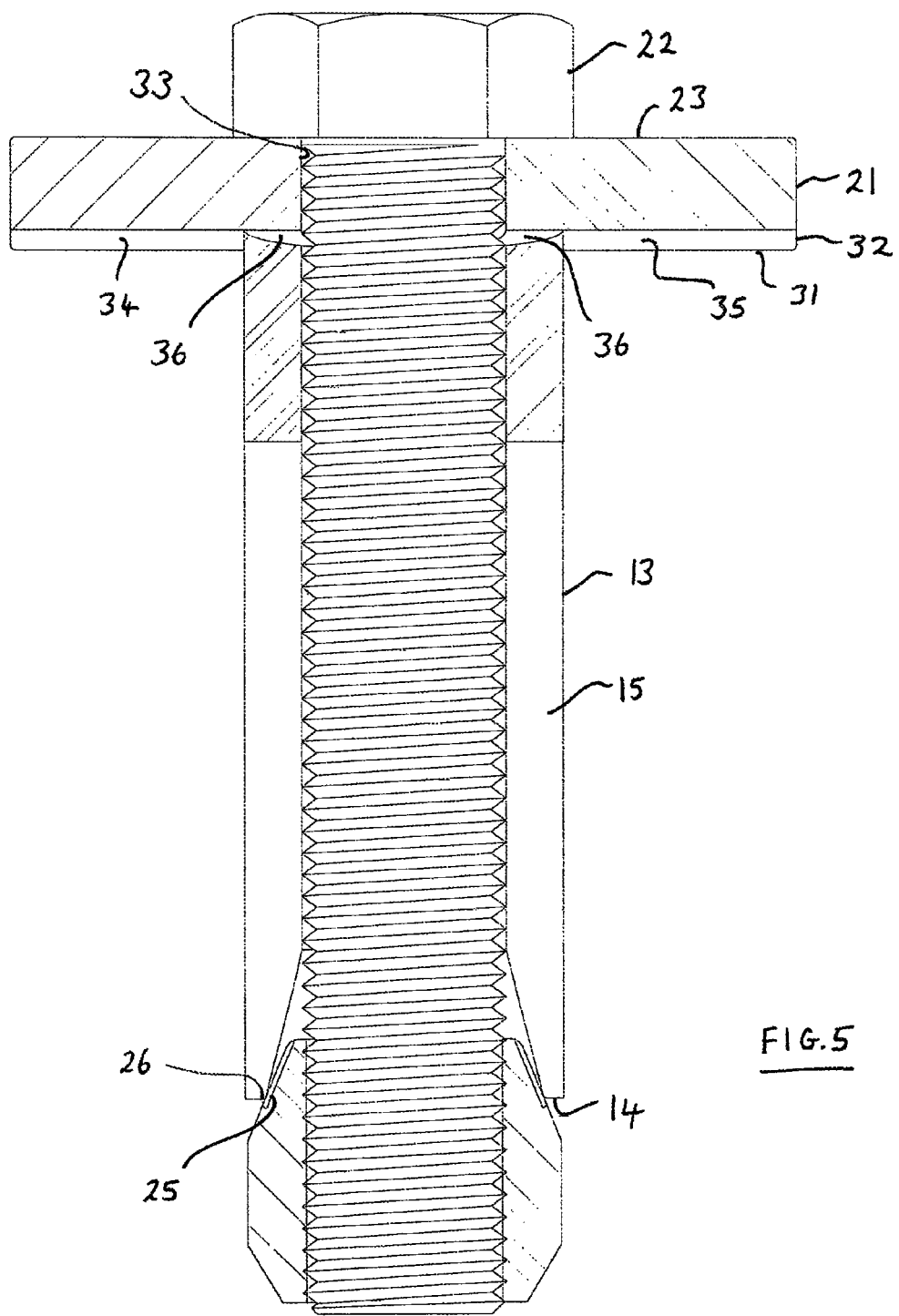
FIG. 5 is a longitudinal sectional view of the connector.

A metal connector 10 (see FIG. 1) for use as a blind fastener to exert a clamping force in the direction X to clamp together a metal plate 11 and part of a hollow metal section 12 is shown in more detail in FIGS. 2 to 5.

The fastener 10 comprises a circular section tubular steel sleeve 13 having a first end 14 to which four slots 15 extend in a direction parallel with the length of the sleeve. None of the slots extend along the whole of the length of the sleeve such that the region of the sleeve close to the other, second end 16 is circumferentially continuous.

A bolt 20 extends through a collar 21 and the sleeve 13 and has a bolt head 22 which in use bears against an outer face 23 of the collar. The distal end of the bolt engages with the screw threaded bore of a tapered expansion head 24 which is of a type known per se and has a frusto-conical region 25 which engages with edges 26 of the slot ends such that said engagement inhibits relative rotation of the head and sleeve.

In contrast to hitherto known types of blind fasteners the confronting surfaces 30,31 of the collar and first end of the sleeve are formed with inter-engaging formations. The collar surface 31 is formed with a V section groove 32 which extends across the width of the collar and is aligned with the centre of the collar aperture 33 such that it comprises two portions 34,35. Each of those portions is engaged by a respective one of two diametrically opposite V shaped protrusions 36 at the first end of the sleeve in a manner in which, in the assembly, the inter-engagement of the protrusions with the recess 32 resists relative rotation.

Use of the connector 10 to form the assembly shown in FIG. 1 is effected in a manner corresponding to that of hitherto known blind fasteners and well known to users of such devices.

Contrary to the conventional wisdom of needing to provide a blind fastener which is axially compressible, in accordance with this invention it is taught that the sleeve is not required to be axially compressible and is to be free to move axially in a direction away from the collar. It is believed that this contributes to the ability of the blind fastener of the present invention to achieve an unexpectedly enhanced strength of clamping force between two components.

The invention claimed is:

1. A blind fastener for clamping together two components through which, in use, the fastener extends, said fastener comprising:
    a sleeve having a first end which is radially expandable;
    a threaded fastener configured to extend through the sleeve;
    an expansion head threadedly mounted on the threaded fastener to engage with said first end of the sleeve whereby movement of the expansion head towards a second end of the sleeve forces the first end to expand;
    a collar configured to engage with the second end of the sleeve and having an aperture through which the threaded fastener extends,
    wherein the threaded fastener has a head formation for effecting rotation of the threaded fastener in an assembled condition in which the collar is positioned between the head portion and the sleeve, said second end of the sleeve and the collar define confronting surfaces and said confronting surfaces comprise inter-engaging formations which resist relative rotation of the sleeve and collar but permit their axial separation, and the inter-engaging formations in the confronting surfaces of the sleeve and collar comprise a depression in the surface of the collar.

2. The blind fastener according to claim 1, wherein the sleeve is substantially incompressible in the direction of the length thereof.

3. The blind fastener according to claim 1, wherein the material of the sleeve has modulus of elasticity of more than 50 GPa.

4. The blind fastener according to claim 1, wherein the material of the sleeve is a metallic material such as steel and having a modulus of elasticity of at least 125 GPa.

5. The blind fastener according to claim 1, wherein the inter-engaging formations in the confronting surfaces of the sleeve and collar comprise a protrusion defined by the shape of the second end of the sleeve.

6. The blind fastener according to claim 1, wherein the depression extends in a length direction which is parallel with the collar surface.

7. The blind fastener according to claim 1, wherein the depression intersects with a longitudinal axis of the sleeve.

8. The blind fastener according to claim 1, wherein the depression extends across the whole of the width of the collar surface thereby to comprise two portions separated by the collar aperture.

9. The blind fastener according to claim 1, wherein the depression comprises a sloping surface which is inclined to the collar surface and the longitudinal axis of the sleeve.

10. The blind fastener according to claim 9, wherein the depression has a length direction and comprises at least one sloping side face as considered in a cross-sectional plane perpendicular to said length direction.

11. The blind fastener according to claim 10, wherein the depression is substantially of a V shape in cross-section.

12. The blind fastener according to claim 1, wherein the second end of the sleeve comprises a pair of V-shape ridges each to engage with a respective one of two portions of a depression in the collar.

13. The blind fastener according to claim 1, wherein the collar is substantially rigid and substantially incompressible in the length direction of the sleeve.

14. The blind fastener according to claim 1, wherein the area of said confronting surface of the collar which is free from any depression is at least 50% of the area defined by the periphery of said confronting surface of the collar.

15. The blind fastener according to claim 1, wherein said first end of the sleeve comprises slots which extend longitudinally relative to the sleeve.

16. The blind fastener according to claim 15, wherein at least one of said slots has a width dimension, at least close to the first end of the sleeve, sufficient to enable the slot edge to be engaged by the expansion head in a manner in which the head is inhibited from rotating relative to the sleeve.

17. The blind fastener according to claim 1, wherein the sleeve is circumferentially continuous in the region of said second end of the sleeve.

18. The blind fastener according to claim 1, wherein the collar has an outer peripheral surface which is of a non-circular cross-section.

19. An assembly comprising two components secured together by a blind fastener according to claim 1.

* * * * *